Feb. 23, 1926.                H. E. WARREN                1,574,716
                              TRACTOR HITCH
                           Filed Dec. 31, 1923
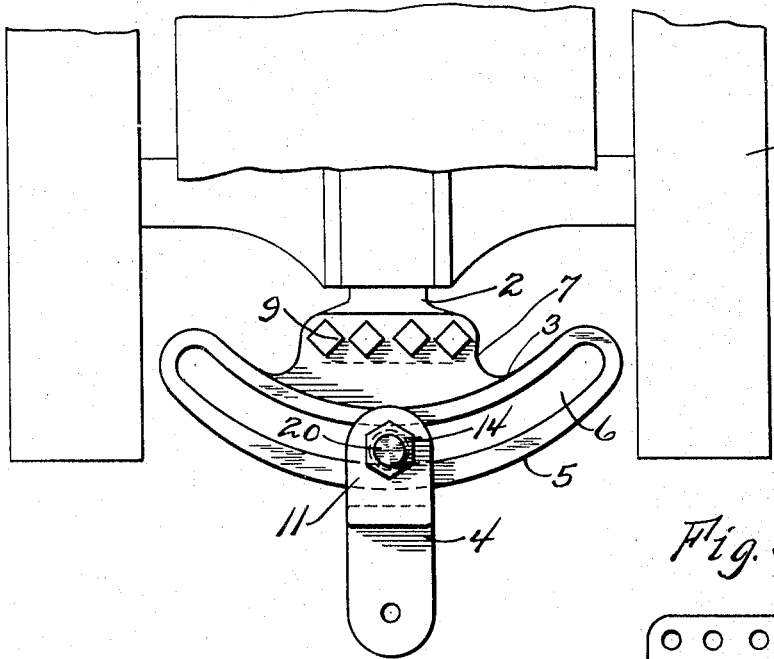
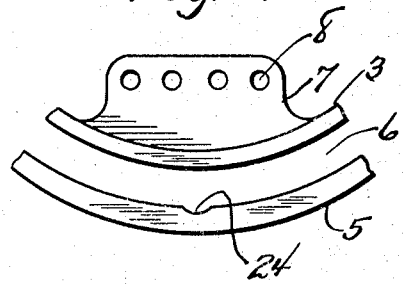
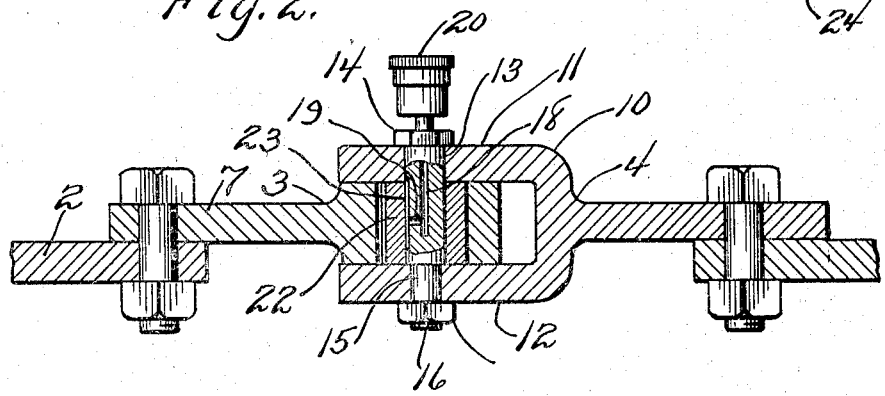
WITNESSES                                           Inventor
                                                 H. E. Warren
                                             By
                                                   Attorney Patented Feb. 23, 1926.

1,574,716

UNITED STATES PATENT OFFICE.

HARRY E. WARREN, OF TRACY, MINNESOTA.

TRACTOR HITCH.

Application filed December 31, 1923. Serial No. 683,764.

*To all whom it may concern:*

Be it known that I, HARRY E. WARREN, a citizen of the United States, residing at Tracy, in the county of Lyon and State of Minnesota, have invented certain new and useful Improvements in Tractor Hitches, of which the following is a specification.

The present invention relates to a tractor hitch and has for its principal object to provide a device of this nature which may be readily attached to a tractor or the like for pulling agricultural implements or the like allowing the tractor to be readily steered, the hitch being so constructed that in turning the tractor there will be no tendency of the front wheel of the agricultural implements or the like skidding.

Another important object of the invention is to provide a device of this nature possessed of a simple and efficient construction, one which is reliable in operation, comparatively inexpensive to manufacture, durable, and well adapted to the purpose for which it is intended.

A still further important object of the invention is to provide a device of this nature having a structure so that the clevis attached to the towed implement or vehicle will have a tendency to center itself in the hitch when the tractor is moving in alinement with the towed vehicle or implement.

With the above and numerous other objects in view as will appear as the description progresses, the invention resides in certain novel features of construction, and in the combination and arrangement of parts as will be hereinafter more fully described and claimed.

In the drawing:

Figure 1 is a plan view of the rear portion of a tractor showing my invention attached thereto, Figure 2 is a section through the hitch, and Figure 3 is a plan view of a portion of the hitch.

Referring to the drawing in detail it will be seen that 1 designates a tractor provided with the draw bar 2 extending rearwardly therefrom.

My hitch includes a plate 3 and a clevis 4. The plate 3 is provided with a curved body 5 having a curved slot 6 therein. On the concaved end of this curved body 5 there is provided a lip 7 having a plurality of apertures 8 therein for receiving bolts 9 which are adapted to pierce the draw bar 2 so as to fixedly engage the plate with this draw bar.

The clevis 4 is constructed with a bifurcated end 10 having an upper plate 11 and a lower plate 12. A pin 13 passes through the plates 11 and 12, the head 14 resting on top of the plate 11, the end 15 being reduced and piercing the plate 12 and provided with a threaded terminal 16 for the reception of a nut 17. This pin is provided with a bore 18 extending from its head 14 longitudinally and provided intermediate its ends with a by path 19. A suitable oil receptacle 20 is mounted in the head 14 of the pin so as to feed all into the bore 18. A roller 22 is rotatable on this pin 13 between the plates 11 and 12 and is lubricated by the oil passing through the bore 18 and the by path 19, it being noted that a longitudinally disposed slot 23 is provided on the exterior surface of the pin communicating with the by path 19. This roller engages within the slot 6 on the plate 3. As is seen to advantage in Figure 3 the notch 24 is provided in the slot 6 at its rear side. This notch 24 is centrally disposed that is in alinement with the tractor and the draw bar 2 so that the clevis 4 will naturally move to a position whereby the roller 22 thereof engages the notch 24 when the tractor is pulling straight ahead with its towed vehicle in alinement therewith.

It is thought that the construction, operation, and advantages of the hinge will now be readily understood without any more detailed description thereof. While the preferred embodiment of the invention has been described in detail, it will be understood that I do not wish to be limited to the particular construction set forth, its various changes in the form, proportions and arrangements of parts, and in the details of construction may be resorted to without departing from the spirit and scope of the invention as hereinafter claimed or destroying any of its advantages.

Having thus described my invention, what I claim as new is:

1. A tractor hitch of the class described including a curved plate having a curved slot therein, a clevis, a roller carried thereby and engaged with said slot, the slot being provided with a centrally disposed notch at its rear side with which said roller is adapted to engage when a tractor to which the hitch is applied is pulling straight ahead.

2. A tractor hitch of the class described comprising a plate having a curved slot therein, a clevis having a bifurcated end, a roller journaled between the bifurcations of said end and engaged in the slot of the plate, said plate provided with a notch in the rear side of the slot, said notch being centrally disposed to be engaged by the roller when the tractor to which the hitch is attached is pulling straight ahead.

In testimony whereof I affix my signature.

HARRY E. WARREN.